United States Patent

Masai et al.

Patent Number: 5,287,814
Date of Patent: Feb. 22, 1994

[54] CAR BODY OF RAILWAY ROLLING STOCK AND METHOD FOR FABRICATING CAR BODY

[75] Inventors: Kentaro Masai; Seiichi Okamoto; Sumio Okuno; Keiji Ohmura, all of Kudamatsu, Japan

[73] Assignee: Hitachi, Ltd., Tokyo, Japan

[21] Appl. No.: 921,586

[22] Filed: Jul. 30, 1992

Related U.S. Application Data

[63] Continuation of Ser. No. 745,169, Aug. 15, 1991, abandoned, which is a continuation of Ser. No. 508,695, Apr. 13, 1990, abandoned.

[30] Foreign Application Priority Data

Apr. 14, 1989 [JP] Japan .................................. 1-92876

[51] Int. Cl.⁵ .............................................. B61D 17/00
[52] U.S. Cl. ................................... 105/422; 105/418; 105/419
[58] Field of Search ................ 52/336, 73, 250, 230, 52/741, 781, 777; 105/397, 396, 413, 422, 424, 425, 413, 401, 404, 409, 414; 403/393, 388, 384

[56] References Cited

U.S. PATENT DOCUMENTS

| | | | |
|---|---|---|---|
| 1,855,082 | 4/1932 | Young | 105/422 |
| 2,504,111 | 4/1950 | Dean | 105/397 |
| 2,587,754 | 3/1952 | Osborn | 105/422 |
| 3,420,192 | 1/1969 | Ellis | 105/422 |
| 4,645,258 | 2/1987 | Ohmura et al. | 105/422 |
| 4,787,669 | 11/1988 | Wante | 105/422 |
| 4,794,032 | 12/1988 | Fujii et al. | 105/422 |
| 4,966,082 | 10/1990 | Takeichi et al. | 105/422 |

FOREIGN PATENT DOCUMENTS

| | | | |
|---|---|---|---|
| 0241116 | 10/1987 | European Pat. Off. | 105/422 |
| 0568446 | 3/1957 | Italy | 105/422 |

*Primary Examiner*—Mark T. Le
*Attorney, Agent, or Firm*—Antonelli, Terry, Stout & Kraus

[57] ABSTRACT

A car body of railway rolling stock suitable for use for passenger cars or electric passenger cars and easy to fabricate at a low material cost. An underframe constituting the car body comprises a center underframe produced at light-alloy extruded shapes and an end underframe produced of a ferrous material, and a roof framing, a side framing and an end framing which constitute the car body are composed of outer plate members produced of a ferrous material and frame members produced of a ferrous material.

5 Claims, 7 Drawing Sheets

CAR BODY OF RAILWAY ROLLING STOCK AND METHOD FOR FABRICATING CAR BODY

This is a continuation of application Ser. No. 745,169, filed on Aug. 15, 1991, now abandoned; which is a continuation of application Ser. No. 508,695, filed on Apr. 13, 1990, now abandoned.

FIELD OF THE INVENTION

The present invention relates to a car body of railway rolling stock and a method for fabricating a car body and, more particularly, to a car body of railway rolling stock and a method for fabricating a car body suitable for passenger cars or electric passenger cars.

BACKGROUND OF THE INVENTION

Generally, car bodies of rolling stock are produced of light alloys such as aluminum alloys, steel for structural use or stainless steel materials. In the car bodies of rolling stock, the whole body is essentially constructed of one type of material.

A car body produced or a stainless steel material has a long life because the stainless steel is less susceptible to corrosion than an aluminum alloy and steel. A stainless steel body, however, requires a special surface treatment of its outer places when the body surface is to be painted. Therefore, the stainless steel body requires considerable time and labor for painting. A car body built of an aluminum alloy material is light in weight and easy to paint; however, an aluminum alloy is more expensive than stainless steel. Therefore the material cost of aluminum alloy car body is higher than that of stainless steel body and body built of steel for structural use. However, the steel material for structural use is susceptible to corrosion as compared with the stainless steel and heaver than the aluminum alloy material. The car body built of steel for structural use is heavier than the aluminum alloy body and has a shorter service life than the stainless steel body.

Recently various technologies have been proposed for joining different types of materials. Also there has been achieved improvement in the strength of the connecting section of material, thereby enabling the combination of the different types of materials, for example, a light alloy material and a steel material for structural use. In the meantime, there has been an increase in the number of railway cars equipped with control equipment and air-conditioning apparatus on the undersurface of an underframe. In a car body described above, it is imperative to construct the underframe such that the various equipment can be mounted on the undersurface of the underframe as easily as possible. The underframe, therefore, is built of a plurality of extruded shapes of aluminum alloy formed integral with a rail sturdy enough to support the various equipment. The plurality of the extruded shapes of aluminum alloy extend in the longitudinal direction of the car and are arranged in parallel with the direction of width of the car body and joined to one another by welding. A side framing of a stainless steel material or a steel material is used for structural purposes. A car body using an underframe made up of the extruded shapes of an aluminum alloy joined with the side framing is proposed in, for example, Japanese Laid-Open Utility Model No. 60-108584, wherein the entire body of the underframe is composed of extruded shapes of aluminum alloy; however, no consideration is given to the reduction of material costs in fabricating the underframe.

Another example of the car body underframe composed of extruded shapes of aluminum alloy is proposed in, for example, Japanese Laid-Open Patent No. 62-94466, wherein an equipment mounting section is provided separately from sections for other equipment is built as one frame by assembling and joining these sections. Since this underframe is generally constituted of the extruded shapes of aluminum alloy, material costs are increased.

SUMMARY OF THE INVENTION

A first object of the present invention is to provide a car body of railway rolling stock capable of minimizing a material cost of the whole car body and facilitating the mounting of various kinds of equipment to be mounted on the undersurface of an underframe.

A second object of the present invention is to provide a car body of railway rolling stock capable of preventing a trouble likely to be caused by corrosion in addition to the first object.

A third object of the present invention is to provide a car body of railway rolling stock capable of facilitating the painting of at least car body sides in addition to the first or the second object.

To accomplish the first object, the underframe is composed of the center underframe formed of extruded shapes of a light alloy and end underframe formed of a ferrous material. The center and end underframes are connected by a coupling means at each longitudinal end of the car body.

A further object of the present invention is to provide, in the underframe, a coupling means capable of smoothly transmitting, between the center underframe and the end underframe, a car end load passing to the underframe through a coupler.

A still further object of the present invention is, in the underframe, to decrease the weight of a side sill by decreasing the plate thickness of the side sill constituting the end underframe, by transmitting the car end load by the center underframe.

Another object of the present invention is, in the underframe, to reduce the weight of the whole body of the underframe.

Other object and features of the present invention will be apparent from the following description of embodiments of the present invention.

DESCRIPTION OF THE PREFERRED EMBODIMENTS

Figure 1:
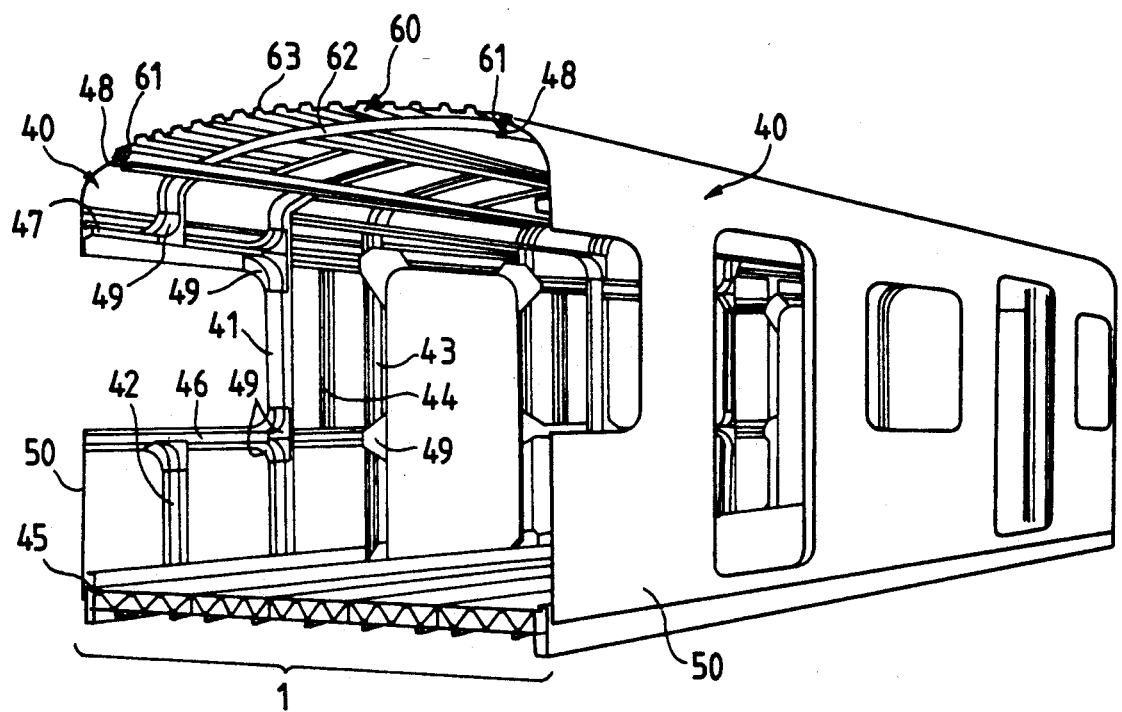
FIG. 1 is a perspective view, partly in cross section, of a car body according to one embodiment of the present invention.
Figure 2:
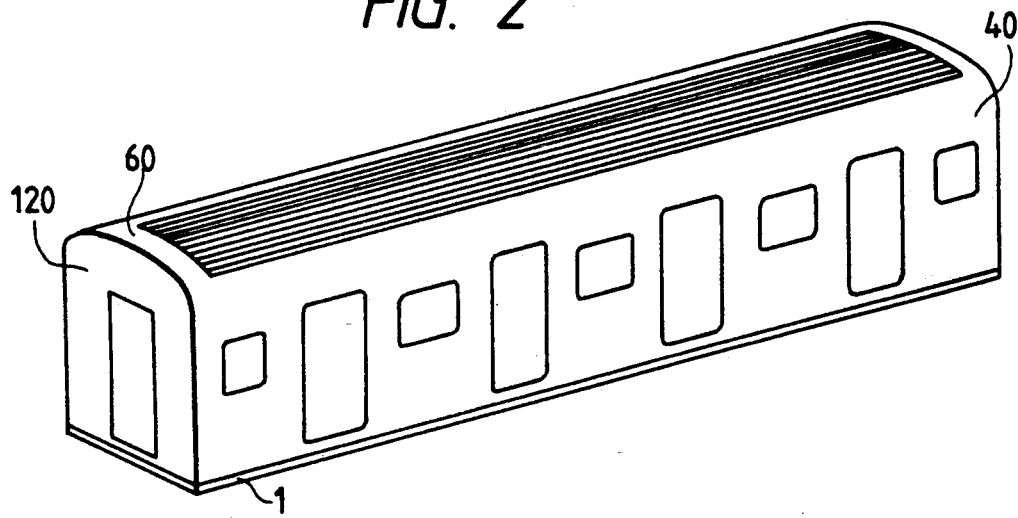
FIG. 2 is a perspective view showing the whole body of the car body shown in FIG. 1.
Figure 3:
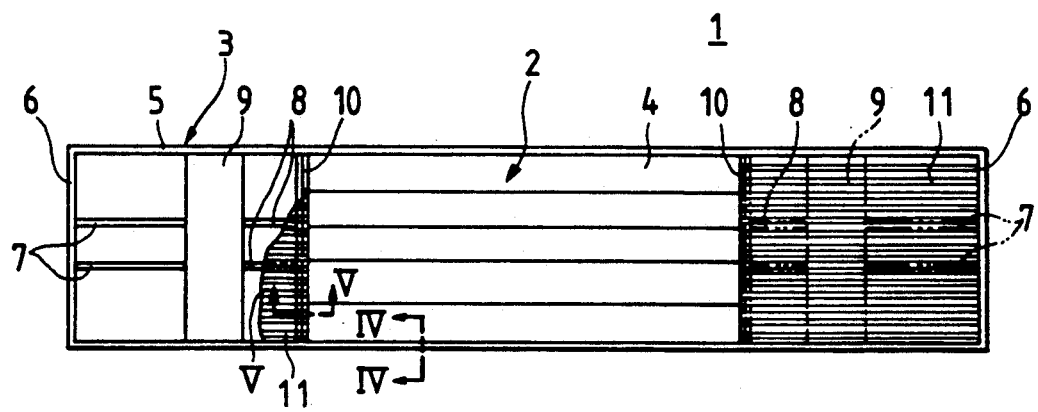
FIG. 3 is a plan view showing an underframe of the car body shown in FIG. 1.

Referring now to the drawings wherein like reference numerals are used throughout the various views to designate like parts and, more particularly, to FIGS. 1-6, a first embodiment of a car body of railway rolling stock according to the present invention includes an underframe constituting the undersurface of the car body. A side framing 40 constitutes both sides of the car body. A roof framing 60 constitutes an upper surface, or a roof section, of the car body. An end frame 70 constitutes car body ends in the longitudinal direction of the car body.

The side framing 40 includes side frames such as, for example, side posts 41, studs 42, door posts 43, stiffeners 44, rocker rails 45, belt rails 46, window heads 47 and cant rails 48, joined through joining members 49, and a side outer plate 50 on the outside of these side frame members. The side frame members and the side outer plate 50 are produced of steel for structural use. The roof framing 60 is constructed by assembling and joining roof frame members such as, for example, cant rails 61 and carlines 62, and also by joining roof outer plate 63 on the outside of these roof frame members. The roof outer plates 63 are stainless steel plates having corrugated sections. The roof frame members are produced from stainless steel or steel for structural use. The end framing 70 is constructed by assembling end frame members such as, for example, corner posts, end posts, end plates and stiffeners and by joining them through joining members and also by joining end outer plates to the outside of these end frame members. The end frame members and the end outer plates are produced of steel for structural use. The detailed construction of the end framing 70 is not illustrated.

The underframe 1 includes a center underframe 2 and an end underframe, with the center underframe 2 being constructed by parallelly joining a plurality of extruded shapes 4 of an aluminum alloy. The extruded shapes 4 extend in the longitudinal direction of the car body of the underframe and are parallelly arranged in the direction of width of the car body on the underframe. The extruded shape 4 has an interior hollow part 4a, and is formed integrally with an equipment attaching rail 4b for supporting various equipment such, for example, control equipment or an air-conditioning apparatus on the undersurface.

The end underframe 3 includes side sills 5, end beams 6, center sills 7, 8, a body bolster 9, cross beams 10 and a floor member 11. The two side sills 5, extending in the longitudinal direction of the car body, are arranged at both ends of the underframe in the direction of width of the car body, with the ends of the underframe being connected by the two end beams 6. The body bolster 9 is located close to the center of the underframe in the longitudinal direction of the car body rather than the end beams 6. This body bolster 9 is disposed correspondingly to the center of the truck. The two center sills 7 are disposed parallelly with the side sills 5 between the end beams 6 located at both end of the underframe in the longitudinal direction of the car body and the body bolster 9. Each end of the center sills 7 is joined to the end sill 6 and the body bolster 9. A spacing between the two center sills 7 is wide enough to install a coupler therebetween. The two cross beams 10 are disposed parallelly with the body bolsters 6 between the two side sills 6, with their ends connected to the side sills 5. The cross beam 10 are arranged close to the center of the underframe in the longitudinal direction of the car body rather than the body bolster 9. The side sills 5, the end beams 6, the center sills 7, 8, the body bolster 9 and the cross beams 10 are produced of steel for structural use or stainless steel. The floor member 11 covers the upper surface of the center sills 7, 8 and the body bolster 9 and the cross beams 10 located between the two side sills 5. The floor member 11 includes a keystone plate 11a produced of steel for structural use or stainless steel. A keystone plate 1b forms a joining member for joining the keystone plate 11a with the center underframe 2 and functions as a floor member. The keystone plates 11a and 11b have a corrugated section in the direction of width of the car body. One end of the keystone plate 11a, in the longitudinal direction of the car body, is connected to the end beam 6, while the other end, in the longitudinal direction of the car body, is mounted on the upper surface of the cross beam 10. One end of the keystone plate 11b, in the longitudinal direction of the car body, is connected by welding to the end of the center underframe 2, in the longitudinal direction of the car body, and the other end, in the longitudinal direction of the car body, extends as far as the upper surface of the cross beam 10. The keystone plates 11a and 11b are overlapped above the cross beam and are joined by rivets 12 to the upper flange of the cross beam 10. The rivets 12 forming the joining means may be substituted for by, for example, blind rivets, bolts and nuts, and rivet bonding.

Of a plurality of extruded shapes 4 constituting the center underframe, the extruded shapes 4 located adjacent to the side sill 5 is formed integral with a flange 4c, which is coupled with an upper flange 5a of the side sill 5. The flange 4c and the upper flange 5a are joined by blind rivets 13. The end, in the direction of width of the car body, of the extruded shape 4 located adjacent to the side sill 5 and a lower flange 5b of the side sill 5 are connected by a coupling member 14. The coupling member 14 has a "Z" section. The coupling member 14 and the extruded shape 4 and the lower flange 5b are joined by the blind rivets 13. A hole 4d is provided in the extruded shape 4 for enabling an insertion of the blind rivet 13. The coupling member 14 has a hole 14a, which is used for joining by spot welding, a rocker rail 45 constituting the side framing 40 and the side sill 5 in a position indicated by the arrow W. The blind rivets 13 are joining means, which may be substituted for by, for example, rivets, bolts and nuts, and rivet bonding.

The coupling member 14 may be produced of any one of steel for structural use, stainless steel, and aluminum alloy. Also the coupling 24 of steel for structural use or a stainless steel can be directly joined by welding to the lower flange 5b. Further, the coupling member 14 of aluminum alloy can be joined directly by welding to the lower surface or the side surface of the extruded shape 4.

The steel for structural use usable for the coupling members 14 described above are, for example, steel for general structures, steel for weather-proof structures, high-tension steel, and steel for welded structures. Stainless steel includes, for example, austenitic stainless steel. Also light alloys that can be used are JIS A6063, 6N01, etc.

Next, the car body under fabrication will be described. Two side sills 5, two end beams 6, two center sills 7, two center sills 8, two body bolsters 9, and two cross beams 10 are assembled and joined. Further, the keystone plate 11a is attached to the upper surfaces of the center sills 7, center sills 8, body bolsters 9 and cross beams 10, thus completing the end underframe 3. A plurality of extruded shapes 4 are arranged in the direction of width thereof, being joined to one another by welding. Thereafter, the keystone plate 11b is joined, by welding to, the end of the plurality of extruded shape 4 in the longitudinal direction, thereby completing the center underframe 2. The end underframe 3 and the center underframe 2 are fabricated separately. The center underframe 2 is fitted in a space enclosed by the two side sills 5 and two cross beams 10 of the end underframe 3. Then, the flange 4c of the extruded shape 4 and the upper flange 5a of the side sill 5 are connected by the blind rivet 13. A hole is drilled in the overlapped section of the keystone plate 11a, the keystone plate 11b and the upper flange of the cross beam 5, and the rivet member is inserted in the hole. The keystone plate 11a, the keystone plate 11b, and the upper flange of the cross beam 5 are connected by the rivet member, thus completing the underframe 1. The side framing 40, the roof framing 60, and the end framing 70 are fabricated separately from the underframe 1. The underframe 1, the side framing 40, the roof framing 60 and the end framing 70 thus fabricated are assembled by the following procedure. That is, the side framing 40 is disposed on the upper surface of either end of the underframe 1 in the direction of width of the car body, and the end framing 70 is disposed on the upper surface of either end of the underframe 1 in the longitudinal direction of the car body. Joining between the underframe 1 and the side framing 40, between the underframe 1 and the end framing 70, and between the side framing 40 and the end framing 70 is done by spot welding. Furthermore, the roof framing 60 is disposed above the side framing 40 and the end framing 70. And then joining between the side framing 40 and the roof framing 60 and between the end framing 70 and the roof framing 60 is effected by spot welding, thus completing the car body. Then, the side outer plate 50 of the side framing 40 and the end outer plate of the end framing 70 are painted on the surfaces thereof. After the car body has been thus painted, various equipment such as control equipment or air-conditioning apparatus are mounted on the equipment suspension rail 4b of the extruded shapes 4 of the underframe 1.

As described above, the various types of members constituting the car body are made up at least of three kinds of materials, thereby enabling the reduction of weight of the car body as compared with conventional car bodies of steel for structural use and at a lower material cost than light-alloy car bodies. Namely, constituting the center underframe 2 of a plurality of light-alloy extruded shapes results in an underframe 1 of greater rigidity and lighter weight than conventional underframes of steel for structural use that bear the same degree of car-end load. Since the equipment attaching rail 4b is formed integral with each extruded shape 4, is possible to decrease the number of component parts of the underframe 1, to simplify the construction of the underframe, and to decrease the number of fabrication processes of the underframe 1, thereby enabling cost and weight reduction of the entire car body. The end underframe 3 is built of a steel for structures of stainless steel of lower price than the light-alloy material. Accordingly, the underframe 1 can be produced at a lower material cost than the underframe the entire body built of the light-alloy material. Also it is possible to prevent the end underframe 3 from corrosion by producing it of a stainless steel. This construction will be effective when a lavatory or a toilet is set at the end in the longitudinal direction of the car body. Furthermore, since the side framing 40, roof framing 60 and end framing 70 of the car body of the present invention are produced of an inexpensive steel for structures or a stainless steel, the material cost of the entire car body can be reduced as compared with conventional light-alloy bodies. In addition, the roof outer places 63 are produced of a stainless steel. Because the stainless steel is not susceptible to corrosion, it is unnecessary to take corrosion prevention into consideration and use of thicker roof outer plates 63, thereby achieving the reduction of weight of the roof framing 60.

The weight of the roof framing can be decreased by using fiber-reinforced plastic (FRP) roof outer plates.

Furthermore, the side outer plates 50 of the side framing 40 and the end outer plates of the end framing 70 which are produced of steel for structures can be painted without a special surface treatment because of better paintability of the outer plates of the steel for structure than the stainless outer plates. Therefore, considerable labor and time are not required for painting the side framing 40 and end framing 70 of the car body. The car body produced of the steel for structural use can fully meet varieties of requirements as to car body design.

In the embodiment of the present invention described above, the center underframe 2 of the underframe 1 is produced of a plurality of extruded shapes of aluminum alloy. The weight of the underframe can be reduced more than the underframe 1 by using many light-alloy cross beams in place of the center underframe 2 in parallel with the body bolster 10 between the side sills 5. Further, it is possible to decrease the cost of the underframe and the car body by using, for the end underframe, a steel for structures and a stainless steel of lower cost than the light-alloy material.

Figure 4:
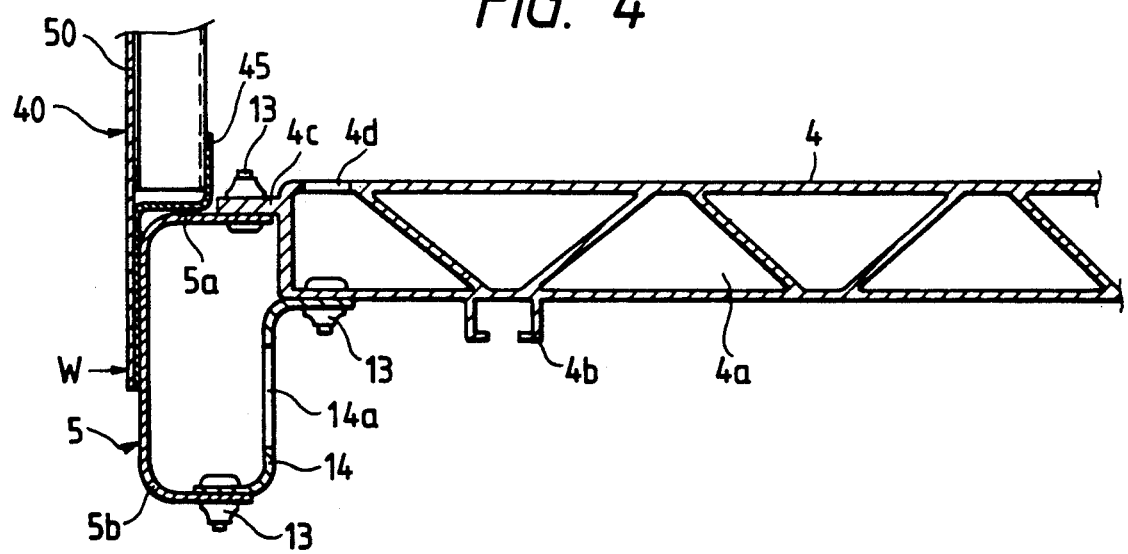
FIG. 4 is a sectional view taken along the line IV—IV of FIG. 3.

The construction of a joining section between the extruded shapes 4 disposed on both sides in the direction of width of car body of the center underframe 2 and the side sills 5 of the end underframe 3 will be explained with reference to FIG. 4. With the joining flange 4c set on the upper flange 5a, the flange 4c is joined to the upper flange 5a by the blind rivets 13, thus joining the extruded shape 4 to the side sill 5. Also, the end section in the direction of width of the extruded shape 4 is connected tot he lower flange 5b by the coupling member 14, thus connecting the extruded shape 4 to the side sill 5. Accordingly, the joining section of the extruded shape 4 and the side sill 5 has a box-like sectional form having improved rigidity and durability. However, because of the box-like sectional form of the joining section of the extruded shape 4 and the side sill 5, it is likely that rain water will accumulate therein. It is, therefore, desirable to make the side sills 5 and the coupling member of stainless steel. It is also desirable to provide the side sill with a water drain hole where there is the possibility of water accumulation in the joining section between the extruded section 4 and the side sill 5. Joining between the underframe 1 and the side framing 40, that is, joining between the side outer plate 50 and the rocker rail 45 and the side sill 5 are effected by spot welding. Plug welding is performed in a joining section, or a body bolster mounting position, between the underframe 1 and the side framing 40, where the spot welding electrode can not be inserted. Since the underframe 1 and the side framing 40 are joined principally by spot welding as described above, joining workability can be improved. It is also possible to reduce distortion occurring in the side framing 40, particularly in the side outer places 50.

Figure 5:
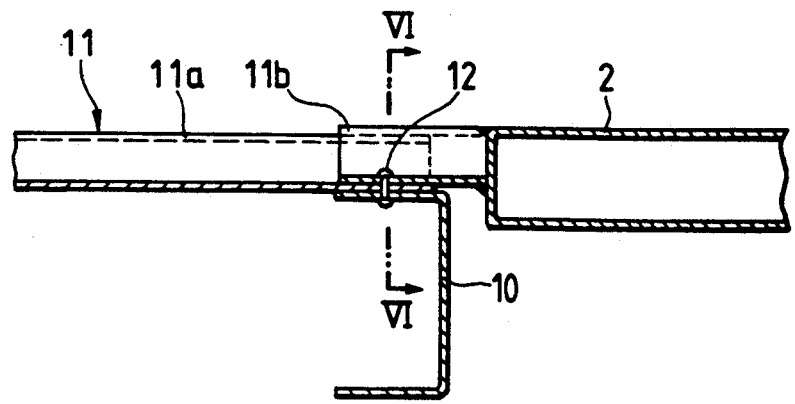
FIG. 5 is a sectional view taken along the line V—V of FIG. 3.
Figure 6:
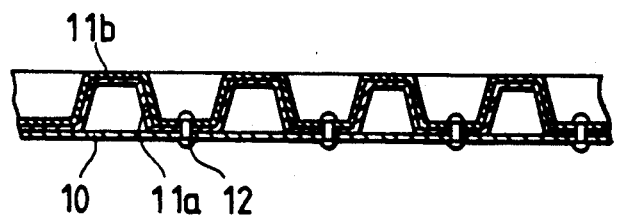
FIG. 6 is a sectional view taken along the line VI—VI of FIG. 5.

Next, the construction of a joining section of the end of the center underframe 2 in the longitudinal direction of the car body and the cross beam 10 of the end underframe 3 and the floor member 11 will be explained with reference to FIGS. 5 and 6. The cross beam 10 and the keystone plate 11a are connected to the center underframe through the keystone plate 11b. Accordingly the car-end load acting on one coupler of the underframe 1 passes to the center underframe 2 through the center sill 7, the body bolster 9, the center sill 8 and the cross beam 10 or through the center sill 7, the body bolster 9 and the keystone plate 11a, and then via the keystone plate 11b. Namely, in the underframe 1, the car-end load acting on one coupler of the underframe is transmitted to the other coupler of the underframe not only along the side sill 5 but along the center underframe 2, thereby enabling the reduction of the car-body load the side sill 5 bears and a decrease in the plate thickness and weight of the side sill 5 itself.

In the underframe 1, the end underframe having the body bolster 9 which transmits the vertical load of the entire car body to the truck is produced of the steel for structural use as described above. Since the underframe 1 is built of high-rigidity material as compared with the underframe the entire body of which is produced of a light-alloy material, the body bolster itself and its surrounding construction can be simplified.

Next, other embodiments of the car body of railway rolling stock according to the present invention will be described with reference to FIGS. 7 to 10 showing the joining section of the center underframe and the side sill.

Figure 7:
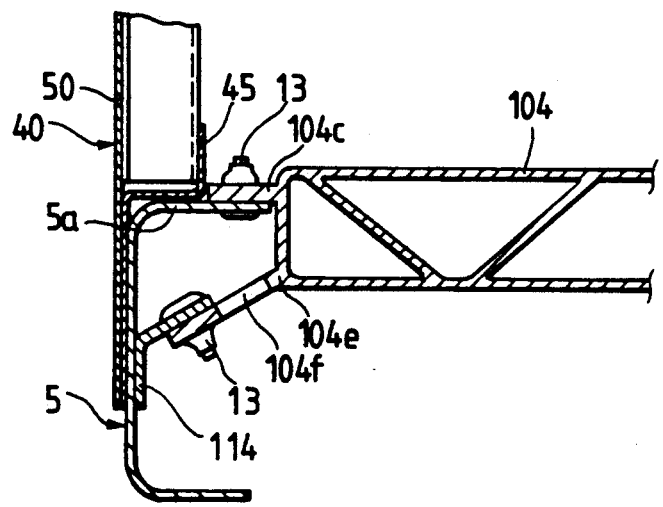
FIGS. 7, 8, 9 and 10 are sectional views of other embodiments of the present invention showing joined sections between a side sill and a center underframe.

First, the embodiment shown in FIG. 7 differs from the first embodiment in the construction of the extruded shape 104 equivalent to the extruded shape 4 used in the first embodiment and the construction of the coupling member 114 equivalent to the coupling member 14 in the first embodiment. The extruded shape 104 is formed integral with a joining flange 104e extending towards the web of the side sill at a lower position where the extruded shape 104 comes in contact with the side sill, with the flange 104e extending obliquely downwardly. The extruded shape 104 has a similar construction as the extruded shape 4 of the first embodiment except for the joining flange 104.3. The flange 104e has a hole 104f for accommodating a blind rivet. The coupling member 114 is formed nearly in the L section. The coupling section 114 is arranged such that one flat section will overlap with the inner surface of the web of the side sill 5, while the other flat section will overlap the joining flange 104e. The coupling member 114 and the flange 104e are joined by the blind rivet 13 at their overlap section. The coupling member 114 and the cross beam 5 are joined by spot welding at their overlap. The joining of the coupling member 114 to the cross beam 5 is done together with spot-welding the rocker rail 45, the side outer plate 50 and the side sill 5. When the center underframe is constructed of the extruded shapes 104, it is difficult to separately fabricate the center underframe and the end underframe. Namely, since the extruded shape 104 has the joining flange 104e, a center underframe, completed by joining with other extruded shapes, can not be inserted between the side sills 5 of the end underframe. Therefore, when the center underframe is constructed of the extruded shapes 104, it is necessary to install a plurality of extruded shapes simultaneously when building the end underframe.

According to such a construction, the joining section between the side sill 5 and the extruded shape 104 can be built into a box-like section, thus improving the rigidity of the joining section. Furthermore, since spot welding for joining the side sill 5 with the side framing 40 can be accomplished without using an access hole, workability can be improved. Also, since a spot-welded part can be directly visually checked, the reliability of the joining section between the side sill 5 and the side framing 40 can be improved. Further it is possible to prevent the entrance of rain water into the joining section by closing the hole 104f after completing the joining between the side sill 5 and the side framing 40. The construction according to the embodiment of FIG. 7 is effective particularly when using the side sills 5 produced from steel for structural purposes.

Figure 8:
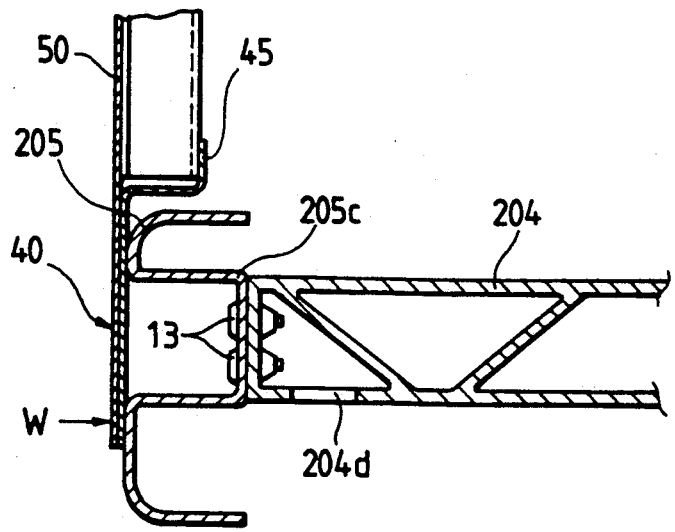

The embodiment shown in FIG. 8 differs in the construction of the extruded shape 204 equivalent to the extruded shape 4 in the first embodiment and in the construction of the side sill 205 equivalent to the side sill 5 appearing in the first embodiment. The end face of the extruded shape 204 which comes in contact with the side sill 5 is perpendicular to the side sill 5. That is, the extruded shape 204 is not provided with the joining flange 4c, 104e. The side sill 205 has a joining section 205c formed for joining with the extruded shape 204 by projecting the web section toward the center side in the direction of width of the underframe. The joining section 205c is formed by bending a material for constituting the side sill 205. For forming the joining section 205c, a conceivable method is to attach members forming the joining section 205c to the web of the side sill 205 by welding. The joining section 205c is joined by the blind rivet 13 to the end face of a part of the extruded shape 204 which comes in contact with the side silt 5. The extruded shape 204 has a hole 205d for the blind rivet 13. The side framing 40 and the side sill 205 are joined by spot welding at the position indicated by the arrow W. Namely, the side sill 205 has a vertical web formed for spot welding.

The side sill 205, having the joining section 205c on the web, has greater rigidity than the upper flange of the side sill. According to the embodiment FIG. 8, it is possible to improve the strength of the entire body of the underframe. Also according to the embodiment of FIG. 8, it is unnecessary to join the extruded shape with the side sill by the coupling member as in the first embodiment. Further, the rigidity of the side sill 205 itself can be improved by forming the joining section 205c on the side sill 205. According to embodiment of FIG. 8, the end underframe and the center underframe, which are fabricated separately, can be joined with ease. The center underframe constructed of the extruded shapes 204 can be inserted between the side sills 205 installed between both sides of the end underframe in the direction of width, in either upward or downward direction of the end underframe. Furthermore, according to the embodiment of FIG. 8, the positional relationship between the upper surface of the side sill 205 and the upper surface of the center underframe constructed of the extruded shapes 204 can be adjusted in the perpendicular direction.

Figure 9:
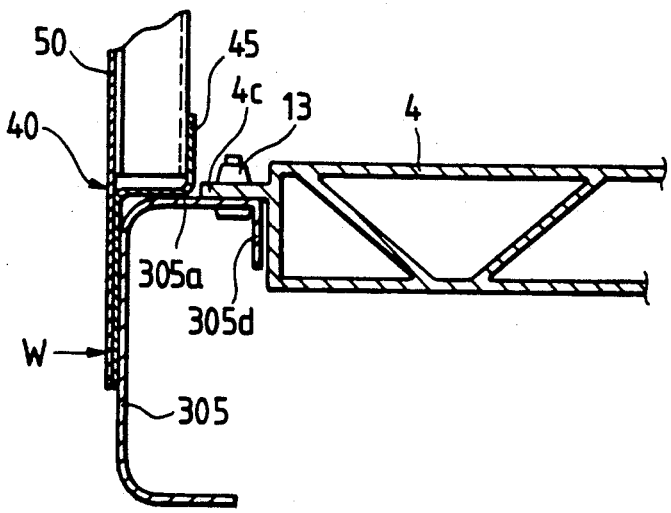

In the embodiment shown in FIG. 9, the construction of the side sill 305 equivalent to the side sill of the first embodiment differs from the first embodiment. On the upper flange 305a of the side sill 305 is formed a rib 305d at the end section on the central side of the upper flange 305a in the direction of width of the underframe. This rib 305d is formed in parallel with the web of the side sill 305 by bending the forward end section of the upper flange 305a.

According to the embodiment of FIG. 9, the upper flange 305d can be improved in rigidity by forming a rib 305d thereon. Therefore, in the construction that the center underframe 4 and the side sill 305 are joined through the flange 4c, and deformation of the upper flange 305a can be prevented. The rib 305d can be formed by bending the forward end of the upper flange 305a and, therefore, can easily be fabricated with the side sill 305 being of simple construction.

Figure 10:
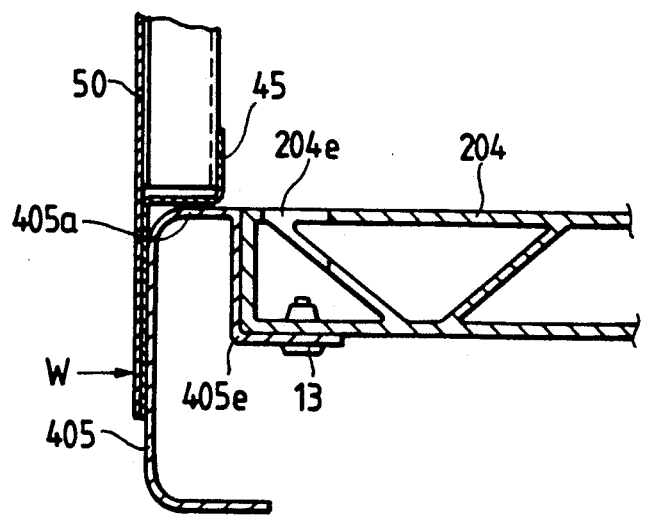

In the embodiment shown in FIG. 10, the construction of the side sill 405 equivalent to the side sill of the first embodiment differs from that of the first embodiment. The extruded shapes of the present embodiment are nearly of similar construction as the extruded shapes shown in FIG. 8. The side sill 405 is provided with a support section 405e which supports the L-sectioned center underframe at the forward end section of the upper flange 405. The support section 405e supports the center underframe in the state wherein the upper surface of the center section 405e is flush with the upper surface of the side sill 405. The support section 405e and the center underframe 204 are joined by the blind rivet 13. The whole 204e is provided for mounting the blind rivet 13. When a blind rivet, capable of joining the support section 405e to the center underframe 204 from one side, is used in place of the blind rivet 13, it is unnecessary to provide the hole 204e in the center underframe 204.

According to the embodiment of FIG. 9, the rigidity of the side sill 405 itself can be improved by forming the support section 405e on the side sill 405. Also it is possible to set the upper surface of the center underframe 204 flush with the upper surface of the side silt 405 simply by mounting the center underframe 204 on the support section 405e, thereby improving operation efficiency in fabricating the underframe.

Next, another embodiment of the car body of railway rolling stock according to the present invention will be explained with reference to FIGS. 11 to 17 which show the construction of the joining section of the floor member and cross beam of the end underframe and the center underframe of the car body of railway rolling stock.

Figure 11:
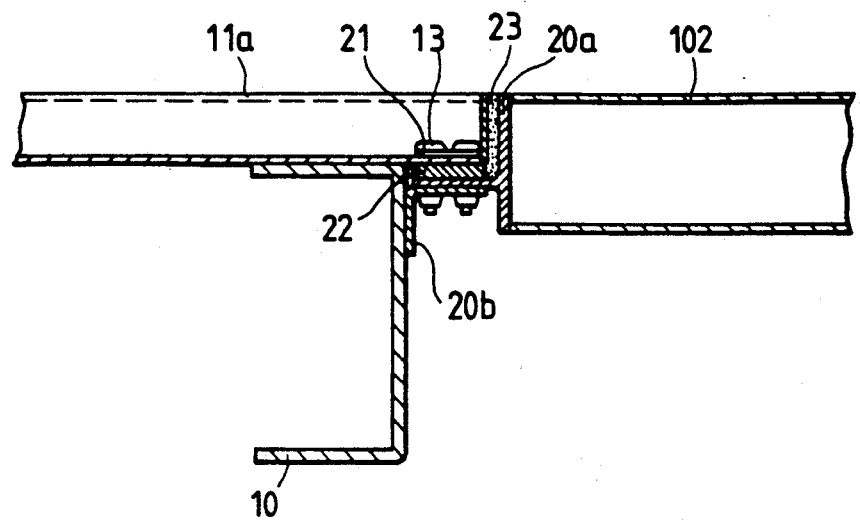
FIG. 11 is a sectional view showing a joined section between an end underframe and a center underframe in another embodiment of the car body according to the present invention.
Figure 12:
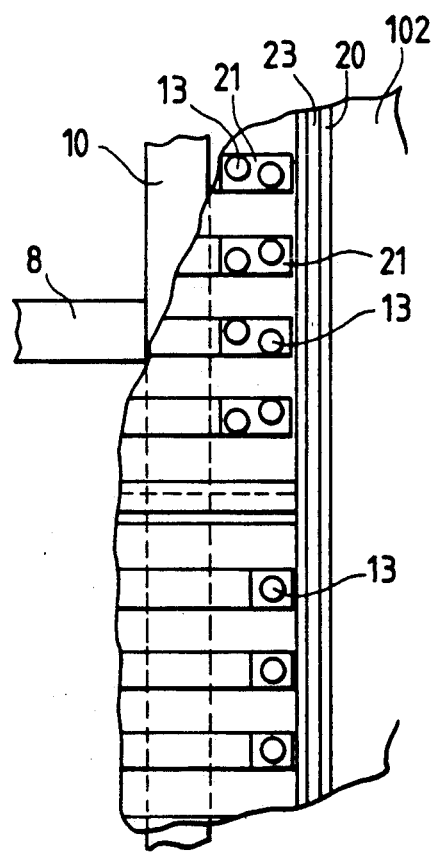
FIG. 12 is a plan view showing the joined section of the end underframe and the center underframe of FIG. 11.

The embodiments shown in FIGS. 11 and 12 differs from the first embodiment in the construction of the joining members 20a and 20b and in the construction of the keystone plate 11a. The center underframe 102 has basically the identical construction as the center underframe 2 of the first embodiment. The joining member 20a is joined at the end of the center underframe 102 in the longitudinal direction of the car body. This joining member 20a, produced of aluminum alloy, has a nearly T-shaped section and is welded to the center underframe 102. A joining member 20b is joined to the web of the cross beam 10. This joining member 20b has a nearly L-shaped section and fashioned of steel for structural use or stainless steel. The joining member 20b is joined to the cross beam 10 by welding, and functions to support the center underframe 102 with respect to the cross beam 10, that is, to function as a support member. The end section of the keystone plate 11a on the center section side of the underframe in the longitudinal direction of the car body extends to a position close to the center underframe 102 rather than the cross beam 10. The keystone plate 11a is overlapped vertically with the joining members 20a and 20b. On the upper surface of the keystone plate 11a is installed a patch 21 corresponding to these overlapped sections, and a spacer 22 is installed between the keystone plate 11a and the joining member 20a. The patch 21, the keystone plate 11a, the spacer 22, the joining member 20a and joining member 20b are vertically overlapping installed and joined all together by the blind rivet 13. An increased number of the blind rivets 13 are used near the center sill 8 as shown in FIG. 12. Thus, increasing the number of the blind rivets 13 facilitates the passage of the car-end load from the center sill 8 to the center underframe 102 or from the center underframe 102 to the center sill 8. Between the end section of the keystone plate 11a on the center side of the underframe, in the longitudinal direction of the car body and the joining member 20a, is filled a filling material 23. For the filling material 23, a polyurethane resin, for example, is used.

According to the present embodiment, since the joining member 20a is installed between the keystone plate 11a and the joining member 20b, no moment will unnecessarily act on these joining sections. Therefore, if a considerable car-end load acts among the joining member 20a, the keystone plate 11a and the joining member 20b, these joining sections will not be subjected to deformation, thus providing a greater strength. Also, since a considerable car-end load can be transmitted among the center underframe 102, the keystone plate 11a and the cross beam 10, the car body load acting on the side sill can be decreased, and, accordingly, it is possible to decrease the plate thickness of the cross beam, thereby reducing the weight of the cross beam itself.

Figure 13:
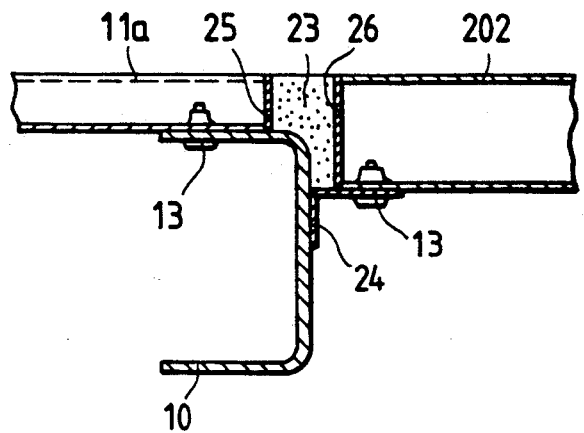
FIGS. 13, 14, 16 and 17 are sectional view of taken other embodiments of the car body according the present invention, showing joined sections of the end underframe and the center underframe.

Next, FIG. 13 shows the construction of the joining section among the center underframe 202, the keystone plate 11a and the cross beam 10, which is different from that of the first embodiment. A support member 24 is attached to the web of the cross beam 10, supporting the end of the center underframe 202 in the longitudinal direction of the car body. The support member 24 and the end section of the center underframe 202 in the longitudinal direction are joined by the blind rivet 13. The keystone plate 11a and the cross beam 10 are joined by the blind rivet 13. The center underframe 202 has a cover plate 26 attached at the end face in the longitudinal direction of the car body. The keystone plate 11a has a cover plate 25, which is attached at the end face in the longitudinal direction of the car body. A space between the cover plate 25 and the cover plate 26 is filled with a filling material 23. This filling material 23 in a set state has strength sufficient to transmit the car-end load between the end underframe and the center underframe 202.

According to the present embodiment, the joining section of the end underframe and the center underframe 202 is of a simple construction, thereby enabling easy fabrication of the underframe. An area between the end underframe and the center underframe 202 is filled with the filling material 23, and, therefore, any dimensional error, if present between these underframe, can easily be compensated. Further, the car-end load can be exactly transmitted through the filling material 23 between the end underframe and the center underframe 202.

Figure 14:
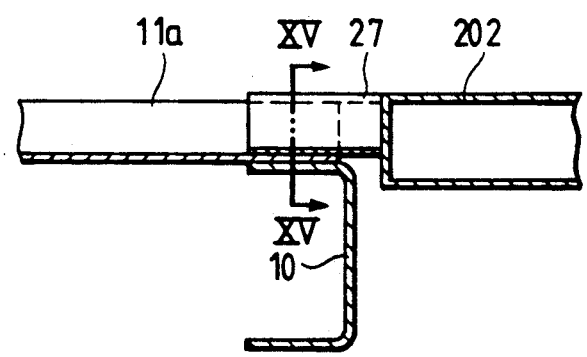
Figure 15:
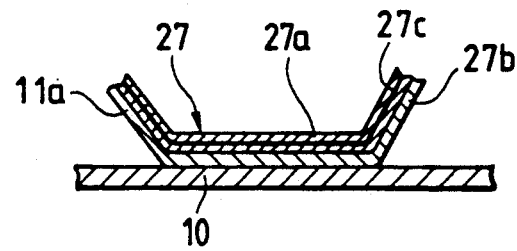
FIG. 15 is a sectional view taken along the line XV—XV of FIG. 14.

The embodiment shown in FIGS. 14 and 15 from the first embodiment in the construction of the joining member 27 and the construction of the joining section among the joining member 27, the keystone plate 11a and the center underframe 202. The joining member 27 is a clad member made by joining an aluminum alloy plate 27a and a plate 27 of stainless steel or steel for structural use by explosive bonding. The joining member 27 is made by inserting a brazing sheet 27c between the plate 27a and the plate 27b and joining them by explosive bonding. This joining member 27 is produced by joining the places 27a and 27b and then by forming into a corrugated form corresponding to the sectional form of the keystone plate 11a. The joining member 27 has both an overlapping part and a nonoverlapping part between the plate 27a and the plate 27b. The nonoverlapping part is joined by welding to the keystone plate 11a and the center underframe 202. Namely, the nonoverlapping part between the plate 27a and the plate 27b is joined to the center underframe 202 by welding. Also, a nonoverlapping part between the plate 27b and the plate 27a is joined to the keystone plate 11a by welding.

According to the present embodiment, the joining member 27 can easily by joined by welding the keystone plate 11a to the center underframe 202. Therefore, according to this embodiment, the end underframe and the center underframe 202 can be joined relatively easily by welding. Further, according to this embodiment, labor and time required in fabricating the underframe can be reduced.

Figure 16:
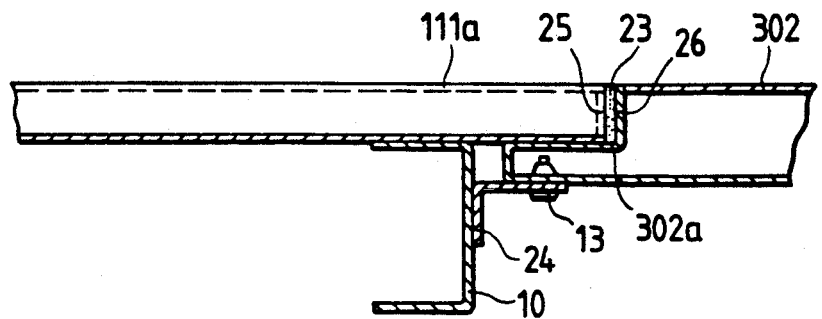

Next, FIG. 16 shows the construction of the center underframe 302 and the keystone plate 111a, which differs from that of the first embodiment. The center underframe 302 has a cutout 302a at the end section in the longitudinal direction of the car body. The vertical size of the cutout 302a coincides with that of the keystone plate 111a. That is, when the end of the keystone plate 111a in the longitudinal direction of the car body is set in the cutout 302a, the upper surface of the center underframe 302 is flush with the upper surface of the keystone plate 111a. The cutout 302a is fitted with a cover plate 26. The end section of the keystone plate 111a, in the longitudinal direction of the car body, protrudes out towards the center underframe 30. Namely, the keystone plate 111a is longer in the longitudinal direction of the car body than the keystone plate 11a of the first embodiment. At the end of the keystone plate 111a in the longitudinal direction of the car body, a cover plate 25 is attached. In a space between the cover plate 25 and the cover plate 26, a filling material 23 is provided. The end of the center underframe 302, in the longitudinal direction of the car body, is connected to the cross beam 10 through the support member 24. The center underframe 302 and the support member 24 are joined by the blind rivet 13.

According to the present embodiment, because of the small amount of filling material 23 in addition to a similar effect as each of the embodiments described above, a car-end compression is exactly transmitted. Filling the filling material 23 permits a dimensional error of each member and also improves the airtightness of the car body.

Figure 17:
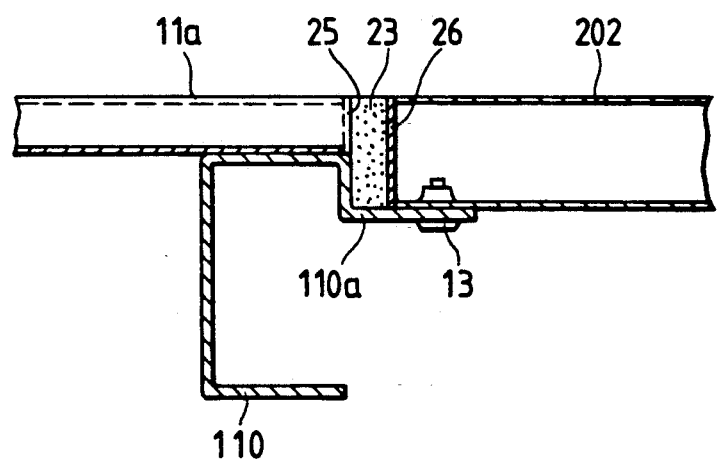

Next, FIG. 17 shows the concentration of the cross beam 110, which differs from the first embodiment. The cross beam 110 is made with the upper flange 110a extended toward the center side of the underframe in the longitudinal direction of the car body. The upper flange 110a has a nearly Z-sectional form, supporting the end of the center underframe 202 in the longitudinal direction of the car body. The upper flange 110a is joined to the end of the center underframe 202 in the longitudinal direction of the car body by the blind rivet 13. The blind rivet 13 can be inserted from under the lower surface side of the upper flange 110a. The keystone plate 11a and the center underframe 202 are fitted with the cover plates 25 and 26 at their end sections as viewed in the longitudinal direction of the car body. Between the cover plate 25 of the keystone plate 11a and the cover plate 26 of the center underframe is filled with the filling material 23.

According to the present embodiment, since the upper flange 110a supporting the center underframe 202 is formed integral with the cross beam 110, the number of component parts of the underframe can be decreased. Also according to the embodiment of FIG. 17, the joining of the end underframe with the center underframe 202 is completed by joining the upper flange 110a with the center underframe 202 after placing the center underframe 202 on the upper surface of the upper flange 110a. Therefore, joining the end underframe with the center underframe 202 can easily be performed. In the embodiment of FIG. 17, the support section of the center underframe 202 is formed integral with the cross beam 110, but a part, corresponding to the upper flange 110a or the support section of the center underframe 202, may include other members joined, by welding, to the cross beam.

In each of the embodiments described above, an example of the end underframe built of steel for structures or stainless steel has been explained. However, it is possible to build the end underframe of a material of high yield strength such as a high-tension steel. Further, the rigidity of the entire body of the underframe can be improved by building the end underframe of the high-tension steel, thereby resulting in a decreased plate thickness of various component members of the underframe and, accordingly, in the decreased weight of the entire body of the underframe.

According to the present invention, it is possible to provide a car body of railway rolling stock capable of minimizing the material cost of the entire car body and facilitating the mounting of various equipment on the undersurface of the underframe.

According to the present invention, it is also possible to provide a car body of railway rolling stock which, in addition to the above-mentioned effects, is capable of preventing the occurrence of problems likely to be caused by corrosion.

Further according to the present invention, it is possible to provide a car body of railway rolling stock which, in addition to a plurality of effects described above, has an effect to facilitate painting of at least side surfaces of the car body.

What is claimed is:

1. A car body of railway rolling stock comprising:

a roof framing including roof outer plate members of a ferrous material and roof frame members of a ferrous material;

two side framings including side outer plate members of a ferrous material and side frame members of a ferrous material;

two end framings including end outer plate members of a ferrous material and end frame members of a ferrous material; and an underframe including an end underframe and a center underframe, said end underframe comprising two side sills, two cross beams connected between said two side sills, and said center underframe including extruded shaped light alloy members, light alloy joining members welded to the ends of said center underframe as viewed in a longitudinal direction of the car body, and coupling means for coupling said joining members to said cross beams of said end underframe, wherein said cross beams are disposed in respective positions close to the center underframe, and said cross beams having coupling flanges extending toward the center underframe, said coupling flanges being connected to respective ones of said joining members by said coupling means.

2. A car body of railway rolling stock comprising:

a roof framing including roof outer plate members of a ferrous material and roof frame members of a ferrous material;

two side framings including side outer plate members of a ferrous material and side frame members of a ferrous material;

two end framings including end outer plate members of a ferrous material and end frame members of a ferrous material; and an underframe including an end underframe and a center underframe, said end underframe comprising two side sills, two cross beams connected between said two side sills, and said center underframe including extruded shape light alloy members, light alloy joining members welded to the ends of said center underframe as viewed in a longitudinal directions of the car body, and coupling means for coupling said joining members to said cross beams of said underframe, wherein said side sills each has an upper flange and a lower flange extending toward a respective side of the center underframe, said center underframe having, on each side thereof, an upper flange member extending toward said upper flange of a respective one of said side sills, and a lower joining member extending toward said lower flange of said respective one of said side sills, said upper flange and said upper flange member being overlapped and connected by second coupling means, and said lower flange and said lower joining member being connected by third coupling means.

3. A car body of railway rolling stock comprising:

an underframe including an end underframe comprising two side sills, two cross beams connected between said two side sills, two end beams connected between respective ends of said side sills and two floor panels all of a ferrous material, at least one of said floor panels including a keystone plate disposed on a respective one of said cross beams;

a center underframe including extruded shaped light alloy members, and arranged between said two side sills;

a light alloy joining member welded to an end of said center underframe, a joining member provided on a web of said respective one of said cross beams, coupling means for coupling said joining members together, wherein said light alloy joining member has a substantially T-shaped cross-section with a stem of said T-shape cross-section being interposed between the keystone plate and said joining member provided on the web of said respective one of said cross beams.

4. A car body of railway rolling stock according to claim 3, wherein a spacer is interposed between said light alloy joining member and the keystone plate.

5. A car body of railway rolling stock according to claim 4, wherein a clearance is provided between an end of the keystone plate and said light alloy joining member, and wherein a filler material is provided in said clearance.

* * * * *